(12) United States Patent
Adachi et al.

(10) Patent No.: US 8,200,672 B2
(45) Date of Patent: Jun. 12, 2012

(54) SUPPORTING DOCUMENT DATA SEARCH

(75) Inventors: Noritaka Adachi, Kanagawa (JP);
Shinya Kawanaka, Tokyo (JP);
Yoshitaka Matsumoto, Kanagawa (JP);
Raymond Harry Putra Rudy,
Kanagawa (JP)

(73) Assignee: International Business Machines Corporation, Armonk, NY (US)

( * ) Notice: Subject to any disclaimer, the term of this patent is extended or adjusted under 35 U.S.C. 154(b) by 421 days.

(21) Appl. No.: 12/490,781

(22) Filed: Jun. 24, 2009

(65) Prior Publication Data

US 2009/0327279 A1    Dec. 31, 2009

(51) Int. Cl.
*G06F 17/30* (2006.01)
(52) U.S. Cl. .......................... 707/739; 707/755; 707/756
(58) Field of Classification Search .................. None
See application file for complete search history.

(56) References Cited

U.S. PATENT DOCUMENTS

| | | | | |
|---|---|---|---|---|
| 2002/0019826 A1* | 2/2002 | Tan | ................. | 707/102 |
| 2002/0174119 A1* | 11/2002 | Kummamuru et al. | ........... | 707/6 |
| 2002/0184205 A1* | 12/2002 | Yoshida et al. | ................... | 707/3 |
| 2003/0069873 A1* | 4/2003 | Fox et al. | .......................... | 707/1 |
| 2004/0083211 A1* | 4/2004 | Bradford | ............................ | 707/3 |
| 2005/0141497 A1* | 6/2005 | Wu | ................................ | 370/389 |
| 2005/0154690 A1* | 7/2005 | Nitta et al. | ....................... | 706/46 |
| 2007/0011151 A1* | 1/2007 | Hagar et al. | ..................... | 707/4 |

FOREIGN PATENT DOCUMENTS

JP    2000-250935    9/2000

OTHER PUBLICATIONS

Carey, Matthew et al. "A Visualization Interface for Document Searching and Browsing." In Proceedings of CIKM 2000 Workshop on New Paradigms in Information Visualization and Manipulation. (2000): 24-28. Print. <http://citeseerx.ist.psu.edu/viewdoc/download?doi=10.1.1.32.6139&rep=rep1&type=pdf>.*

Eguchi, et al, "Incremental Query Expansion Considering Adaptation to User's Behavior Based on Clustering the Search Results", Research Report of Information Processing Society of Japan, 98-DBS-114, vol. 98, No. 2, Information Processing Society of Japan, pp. 43-48, Jan. 19, 1998.

(Continued)

*Primary Examiner* — Syed H Hasan
(74) *Attorney, Agent, or Firm* — Grant A. Johnson; Owen J. Gamon

(57) ABSTRACT

In a search support server, a related word extraction unit generates frequency information and co-occurrence information of keywords, a graph generation unit generates coordinate information of a spring graph including the keywords as nodes, on the basis of the co-occurrence information, a cluster generation unit groups the nodes into clusters and thereby generates cluster definition information, and a display information generation unit generates display information of the spring graph. In addition, an operation determination unit determines which operation is performed on the spring graph. Then, when a level change is instructed, the display information generation unit generates display information of the spring graph after the level is changed. When a node change is instructed, a cluster re-generation unit changes the cluster definition information and the frequency information. When a search query generation is instructed, a search query generation unit generates a search query with a keyword of a selected cluster.

12 Claims, 11 Drawing Sheets

OTHER PUBLICATIONS

Mima, et al, "Development of Web Information Search Support for Children", Feb. 14, 2004, Information-Technology Promotion Agnecy, Japan, http://www.ipa.go.jp/SPC/report/03fy-pro/mito/15-1198d.pdf.

Hayakawa, et al, "A Visual User Interface for Refining Search Engine Results", Research Report of Information Processing Society of Japan, 98-HI-76, 98-IM-33, vol. 98, No. 9, Information Processing Society of Japan, pp. 25-30, Jan. 29, 1998.

Kobayasi Aki, "User Interface for Search in Web Link Space", 2003, Telecommunications Advancement Foundation, http://www.taf.or.jp/publication/kjosei_20/pdf/p453.pdf.

Nagahata, et al, "Query Suggestion Using Plural Visualization Techniques", Mar. 10, 2008, Institute of Electronics, Information and Communication Engineers, http://www.ieice.org/~de/DEWS/DEWS2008/proceedings/files/b5/b5-5.pdf.

* cited by examiner

| KEYWORD | APPEARANCE FREQUENCY | FREQUENCY LEVEL |
|---|---|---|
| html | 94 | 1 |
| C | 90 | 1 |
| Java | 87 | 1 |
| C++ | 78 | 1 |
| Perl | 75 | 1 |
| VC++ | 72 | 1 |
| Ruby | 71 | 1 |
| Python | 70 | 1 |
| printf | 68 | 2 |
| scanf | 65 | 2 |
| ... | ... | ... |

FIG. 4

|  | html | C | Java | C++ | Parl | VC++ | Ruby | Python |
|---|---|---|---|---|---|---|---|---|
| html | - | 5 | 32 | 2 | 21 | 8 | 12 | 10 |
| C | - | - | 23 | 40 | 10 | 23 | 6 | 5 |
| Java | - | - | - | 19 | 14 | 5 | 17 | 15 |
| C++ | - | - | - | - | 5 | 32 | 3 | 7 |
| Perl | - | - | - | - | - | 7 | 35 | 37 |
| VC++ | - | - | - | - | - | - | 9 | 8 |
| Ruby | - | - | - | - | - | - | - | 32 |
| Python | - | - | - | - | - | - | - | - |

FIG. 5

| KEYWORD | CLUSTER |
|---|---|
| html | 2 |
| C | 3 |
| Java | 2 |
| C++ | 3 |
| Perl | 1 |
| VC++ | 3 |
| Ruby | 1 |
| Python | 1 |

(a)

(b)

| KEYWORD | CLUSTER |
|---|---|
| html | 2 |
| C | 3 |
| Java | 2 |
| C++ | 3 |
| Perl | 2 |
| VC++ | 3 |
| Ruby | 1 |
| Python | 1 |

FIG. 12 ered to as Non-Patent Document 3), for example). Moreover, disclosed is a technique for visually arranging and displaying web contents in search results with their web-specific link relationships by use of characteristic information given to the search results (refer to Kobayasi Aki, "User Interface for Search in Web Link Space," 2003, Telecommunications Advancement Foundation (on line), Internet URL: http://www.taf.or.jp/publication/kjosei_20/pdf/p453.pdf (search date, Apr. 1, 2008) (hereinafter, referred to as Non-Patent Document 4), for example). In addition, there is another technique for displaying a spring graph including search word candidates as nodes and co-occurrence relationships between the search word candidates as the edges (refer to Nagahata Hiroomi and another, "Query Suggestion Using Plural Visualization Techniques," Mar. 10, 2008, Institute of Electronics, Information and Communication Engineers (on line), Internet URL: http://www.ieice.org/~de/DEWS/DEWS2008/proceedings/files/b5/b5-5.pdf (search date Apr. 1, 2008) (hereinafter, referred to as Non-Patent Document 5), for example).

SUPPORTING DOCUMENT DATA SEARCH

BACKGROUND OF THE INVENTION

The present invention relates to an apparatus and a method for supporting a document data search. In particular, the present invention relates to an apparatus and a method for supporting a document data search based on a keyword.

Use of a search engine has become the mainstream of search methods for searching the Internet for desired information, for example. As the World Wide Web (WWW) grows larger and larger, the number of web pages displayed as the search results becomes larger as well. Accordingly, it is not always true that the information actually needed by the user is displayed at the top of the search results.

Users need to consider a search word from various perspectives as an input to the search engine. For example, users need to consider whether or not a particular search word is actually the appropriate one, what search word is appropriate to narrow down the search results into ones that include only desired information, approximately how many search words are appropriate, or the like. As described above, it is difficult for average users to determine what search word is appropriate as the input to a search engine.

In this respect, a technique for automatically generating a search query including a combination of search words has been proposed heretofore (refer to Koji Eguchi and two others, "Incremental Query Expansion Considering Adaptation to User's Behavior Based on Clustering the Search Results," Research Report of Information Processing Society of Japan, 98-DBS-114, Vol. 98, No. 2, Information Processing Society of Japan, pp. 43-48, Jan. 19, 1998 (hereinafter, referred to as Non-Patent Document 1), and Hideki Mima and another, "Development of Web Information Search Support System for Children," Feb. 14, 2004, INFORMATION-TECHNOLOGY PROMOTION AGENCY, JAPAN (on line), Internet URL: http://www.ipa.go.jp/SPC/report/03fy-pro/mito/15-1198d.pdf (search date, Apr. 10, 2008) (hereinafter, referred to as Non-Patent Document 2), for example). According to the technique disclosed in Non-Patent Document 1, a huge amount of search results are grouped into clusters, and then, the query is gradually modified each time a user confirms a cluster as an appropriate one. In the technique disclosed in Non-Patent Document 2, search path information is generated by use of ontology information or the like and then presented to the user. The query is then expanded when the user selects a search path.

In addition, the following shows other techniques for supporting a search. For example, disclosed is a technique for searching multiple information sources (refer to Japanese Patent Application Publication No. 2000-250935 (hereinafter referred to as Patent Document 1), for example). In this technique, locations of information and classification information are managed by use of a classification tree, and then, information including a search item and a search condition for finding the structure of the classification tree and an information source are managed as a class definition. Then, a search is performed on the multiple information sources by tracking back entry information stored in the classification tree of the information. In addition, disclosed is a technique for automatically displaying information indicating what hit rate can be obtained as a result of search on a set of original search results by using a new search condition, or the like (refer to Kazuhiro Hayakawa and two others, "A Visual User Interface for Refining Search Engine Results," Research Report of Information Processing Society of Japan, 98-HI-76, 98-IM-33, Vol. 98, No. 9, Information Processing Society of Japan, pp. 25-30, Jan. 29, 1998 (herein As described above, various search support techniques have been proposed heretofore.

However, the technique in Non-Patent Document 1 merely corrects a query according to an evaluation performed by the user on appropriateness of a document cluster, but does not correct a query by allowing a user to specify an appropriate keyword for a search in accordance with a user request. In addition, the technique disclosed in Non-Patent Document 2 performs query expansion on the basis of a search path generated using ontology information or the like, but does not perform query expansion on the basis of a search path including a keyword appropriate for a search in accordance with a user request. Accordingly, any one of the techniques does not resolve a problem that an appropriate keyword in accordance with a user request cannot be specified to perform a search.

Likewise, the techniques disclosed in Patent Document 1, and Non-Patent Documents 3 to 5 do not provide means for performing a search in accordance with a user request by allowing a user to specify a keyword appropriate for the search.

SUMMARY OF THE INVENTION

An object of the present invention is to perform a search in accordance with a user request by allowing a user to specify a keyword appropriate for the search through a simple operation.

In order to achieve the aforementioned objective, the present invention provides an apparatus for supporting a document data search based on a keyword. The apparatus includes: an extraction unit for extracting a plurality of keywords from search target document data; a graph generation unit for generating a graph including a plurality of objects respectively representing the plurality of keywords extracted by the extraction unit and being classified into a plurality of multiple clusters; and a search condition statement generation unit for generating a search condition statement by use of a keyword, in accordance with a user operation to select a specific cluster among the plurality of clusters in the graph generated by the graph generation unit, the keyword being represented by an object that belongs to the specific cluster.

In this apparatus, the graph generation unit may generate the graph in which the plurality of objects are arranged respectively at such positions that a distance between two objects of the plurality of objects corresponds to a degree of co-occurrence of two keywords represented by the two objects, and in which the plurality of objects are classified into the multiple clusters on the basis of information on the positions.

Furthermore, in this apparatus, among keywords that appear in the search target document data, the extraction unit may extract keywords that appear at a specific level of frequency, as the plurality of keywords corresponding to the specific level, and in accordance with a user operation to specify the specific level, the graph generation unit may generate the graph including a plurality of objects respectively representing the plurality of keywords corresponding to the specific level and being classified into a plurality of clusters.

Moreover, in this apparatus, in accordance with a user operation on the specific object included in the graph, the graph generation unit may add a change related to the specific object in the graph. Here, the change related to the specific object may be a change to cause the specific object belonging to a first cluster to belong to a second cluster; a change to merge the specific object and an object different from the specific object and thereby to obtain a single object representing a keyword represented by the specific object and a keyword represented by the different object; or a change to delete the specific object.

In addition, in this apparatus, the search condition statement generation unit may generate the search condition statement including the keyword represented by the object belonging to the specific cluster as any one condition of an AND condition and an OR condition, which is determined previously in accordance with appearance frequency of the keyword. Furthermore, in the apparatus, the search condition statement generation unit may generate the search condition statement including a keyword represented by an object that belongs to a cluster other than the specific cluster, as a NOT condition.

In addition, the present invention provides an apparatus for supporting a document data search based on a keyword. The apparatus includes: an extraction unit for extracting a plurality of keywords from search target document data; a graph generation unit for generating a graph including a plurality of objects respectively representing the plurality of keywords extracted by the extraction unit, the plurality of objects being arranged respectively at such positions that a distance between two objects of the plurality of objects corresponds to a degree of co-occurrence of two keywords represented by the two objects, and the plurality of objects being classified into a plurality of clusters on the basis of information on the positions; and a search condition statement generation unit for generating a search condition statement in accordance with a user operation to select a specific cluster among the plurality of clusters in the graph generated by the graph generation unit, the search condition statement including a keyword represented by an object that belongs to the specific cluster, as any one condition of an AND condition and an OR condition, and also a keyword represented by an object that belongs to a cluster other than the specific cluster, as a NOT condition.

Moreover, the present invention provides a method of supporting a document data search based on a keyword. The method includes the steps of: extracting a plurality of keywords from search target document data; generating a graph including a plurality of objects respectively representing the extracted plurality of keywords and being classified into a plurality of clusters; and in accordance with a user operation to select a specific cluster among the plurality of clusters in the generated graph, generating a search condition statement by use of a keyword represented by an object that belongs to the specific cluster.

Furthermore, the present invention provides a method of supporting a document data search based on a keyword. The method includes the steps of: extracting a plurality of keywords from search target document data; generating a graph including a plurality of objects respectively representing the extracted plurality of keywords and being classified into a plurality of clusters; in accordance with a user operation for a specific object included in the generated graph, adding a change related to the specific object to the graph; and in accordance with a user operation to select a specific cluster among the plurality of clusters in the graph after the change is added thereto, generating a search condition statement by use of a keyword represented by an object that belongs to the specific cluster.

In addition, the present invention provides a program causing a computer to function as an apparatus for supporting a document data search based on a keyword, the program causing the computer to function as: an extraction unit for extracting a plurality of keywords from a search target document data; a graph generation unit for generating a graph including a plurality of objects respectively representing the plurality of keywords extracted by the extraction unit and being classified into a plurality of; and a search condition statement generation unit for generating, in accordance with a user operation to select a specific cluster among the plurality of clusters in the graph generated by the graph generation unit, a search condition statement by use of a keyword represented by an object of the specific cluster.

BRIEF DESCRIPTION OF THE DRAWINGS

For more complete understanding of the present invention and advantage thereof, reference is now made to the following description taken in conjunction with the accompanying drawings.

FIG. 4 is a specific example of frequency information generated according to the embodiment of the present invention.

FIG. 5 is a specific example of a co-occurrence matrix generated according to the embodiment of the present invention.

FIG. 12 is a diagram showing a specific example of cluster definition information after the instruction to move the node between the clusters is issued in the embodiment of the present invention.

DETAILED DESCRIPTION OF THE PREFERRED EMBODIMENT

A detailed description will be hereinafter given of the best mode for carrying out the invention (hereinafter referred to as an "embodiment") with reference to the accompanying drawings.

Firstly, a description will be given of a computer system to which the present embodiment is applied.

Figure 1:
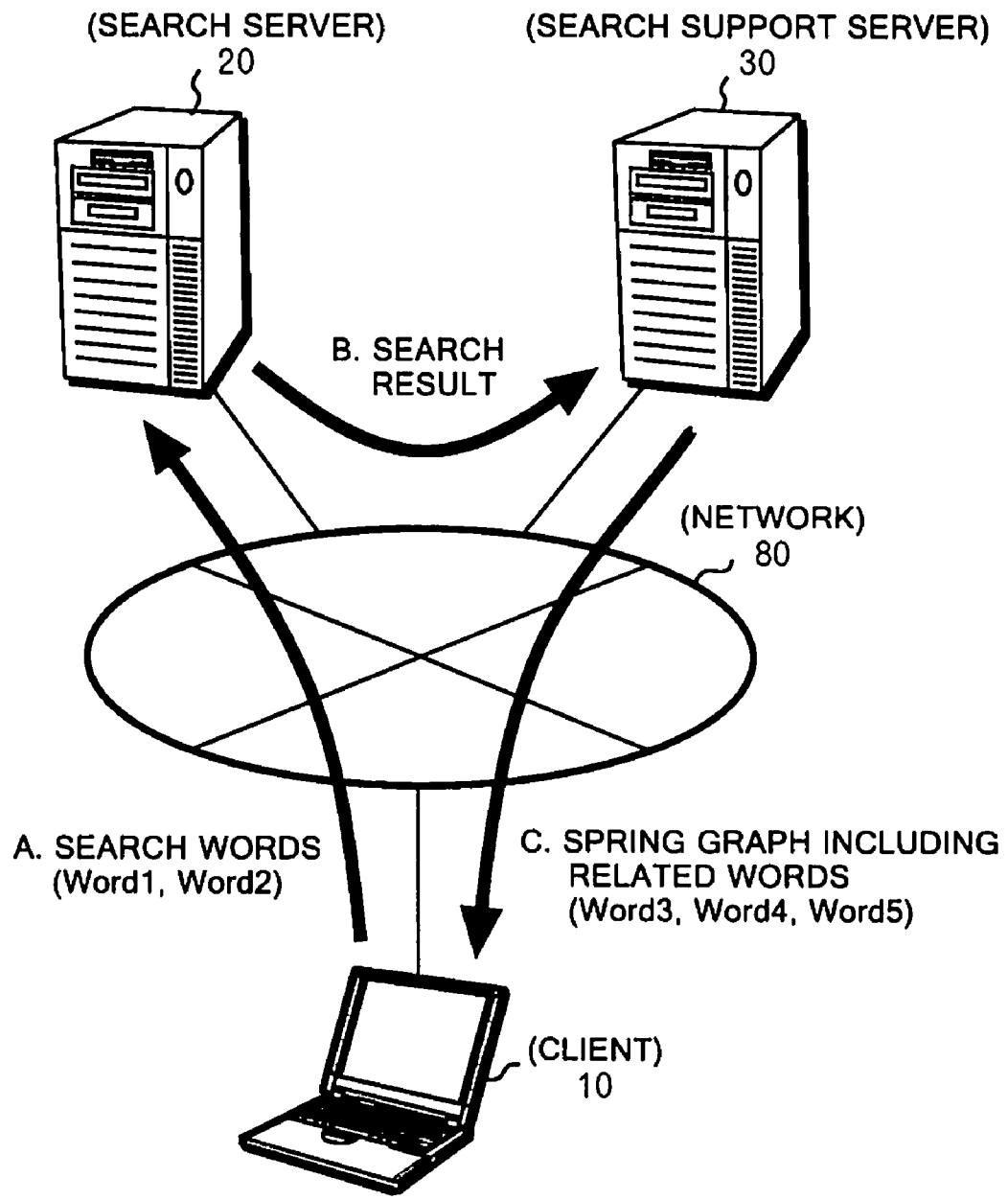
FIG. 1 is a diagram showing an overview configuration of a computer system according to an embodiment of the present invention.

FIG. 1 is a diagram showing an overall configuration example of such a computer system.

As illustrated, this computer system includes a client 10, a search server 20 and a search support server 30, all of which are connected with one another via a network 80.

The client 10 is a terminal device such as a PC used by a user. To be more specific, the client 10 is a terminal device used by a user for inputting a keyword to the search server 20 and then for obtaining a search result from the network 80, or for performing a search again with a search condition changed by use of a spring graph transmitted from the search support server 30. Note that, although only one client is shown in FIG. 1, two or more clients may be used.

The search server 20 is a so-called search engine. The search server 20 is a server computer that transmits a web page to a request source as a search result upon receipt of a search request with a search condition, the web page being an example of document data that matches the search condition. To be more specific, upon receipt of a search request with a search word from the client 10, the search server 20 transmits a web page related to the search word to the client 10. In addition, upon receipt of a search request with a search condition from the search support server 30, the search server 20 transmits a web page that matches the search condition to the search support server 30.

The search support server 30 is a server computer for supporting a search to be performed by the search server 20. To be more specific, the search support server 30 receives a search result from the search server 20 and transmits to the client 10 a spring graph in which keywords including a search word and related words related to the search word are grouped into clusters. Then, when a cluster selected by the user on the spring graph is notified to the search support server 30 by the client 10, the search support server 30 generates a search query, which is an example of a search condition statement, by use of a keyword in the cluster, and then transmits the search query to the search server 20.

It should be noted that although the search server 20 and the search support server 30 are described as different server computers herein, these servers can be provided in a single server computer.

The network 80 is communication means used for transmission and reception of information. As the network 80, the Internet and a local area network (LAN) are exemplified.

A user enters search words (Word1, Word2) into the search server 20 by use of the client 10 as usual in a computer system having the aforementioned configuration (A). In response to this, a search result is not only returned to the client 10, but also is passed to the search support server 30 (B). Then, the search support server 30 returns a spring graph to the client 10 as a user interface (C), the spring graph including related words (Word3, Word4, Word5) acting as nodes obtainable from the search result in addition to the search words. The user is allowed to freely make a change in this spring graph and also to abstractly select an area that the user would like to search. The search server 30 thereby automatically generates a search query and inputs the search query into the search server 20. Specifically, in this embodiment, the search support server 30 displays a relevancy between keywords as a spring graph, and according to an operation performed by the user on the spring graph, the search support server 30 automatically generates a new search query.

In this respect, a description will be first given of a functional configuration of the search support server 30 according to the present embodiment.

Figure 2:
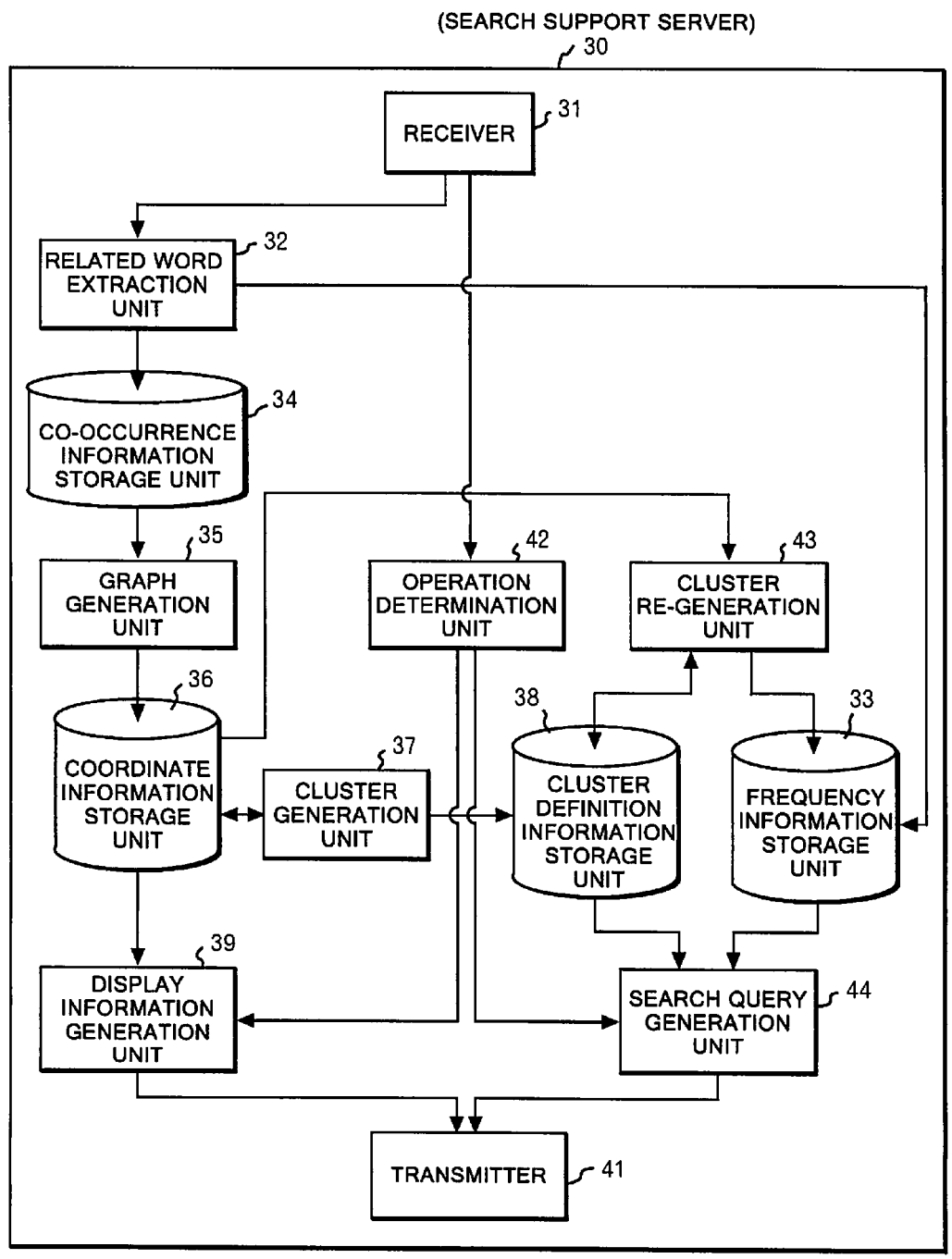
FIG. 2 is a diagram showing a functional configuration diagram of a search support server according to the embodiment of the present invention.

FIG. 2 is a block diagram showing a functional configuration example of the search support server 30 according to the present embodiment.

As illustrated, the search support server 30 includes a receiver 31, a related word extraction unit 32, a frequency information storage unit 33, a co-occurrence information storage unit 34, a graph generation unit 35, a coordinate information storage unit 36, a cluster generation unit 37, a cluster definition information storage unit 38, a display information generation unit 39, and a transmitter 41. In addition, the search support server 30 includes an operation determination unit 42, a cluster re-generation unit 43 and a search query generation unit 44.

The receiver 31 receives a search result from the search server 20 and also receives information related to an operation performed on a spring graph (hereinafter, referred to as "operation information") from the client 10.

The related word extraction unit 32 performs a morphological analysis on a web page of the search result, then generates a related word group by use of a frequency analysis, term frequency-inverse document frequency (TF-IDF), or the like and generates frequency information related to appearance frequency of these related words. In addition, the related word extraction unit 32 finds a degree of co-occurrence between keywords including search words and related words and generates co-occurrence information formed of a co-occurrence matrix including a degree of co-occurrence stored in each cell of the matrix. Here, the degree of co-occurrence can be found by use of a known calculation method. For example, the degree of co-occurrence $C(k1, k2)$ of a keyword $k1$ and a keyword $k2$ can be found by the following expression: "$C(k1, k2)=P(k1, k2)/Pa$." Here, "$P$" $(k1, k2)$ represents the number of pages including both of the keyword $k1$ and the keyword $k2$. In the meantime, "$Pa$" represents the total number of pages. In this embodiment, the related word extraction unit 32 is provided as an example of an extraction unit that extracts multiple keywords from document data.

The frequency information storage unit 33 stores frequency information generated by the related word extraction unit 32.

The co-occurrence information storage unit 34 stores co-occurrence information generated by the related word extraction unit 32.

The graph generation unit 35 generates a spring graph by use of degrees of co-occurrence between keywords. In this spring graph, a node, which is an example of an object, corresponds to a keyword. In addition, an edge is placed between two nodes corresponding to two keywords having a degree of co-occurrence exceeding a predetermined threshold value. At this time, the distance between the two nodes is set so as to be inversely proportional to the degree of co-occurrence of the two keywords corresponding to these nodes. Moreover, the spring graph has a hierarchy structure. In the spring graph, a node corresponding to a keyword of high appearance frequency is set to be an upper level node. In addition, a node corresponding to a keyword being closely related to the upper level node and being of relatively low appearance frequency as compared with that of the upper level node is set to be a lower level node. In this embodiment, however, the graph generation unit 35 does not generate a spring graph itself, but generates coordinate information used for generating a spring graph. To be more specific, the graph generation unit 35 generates coordinate information indicating a position of a node included in the spring graph (hereinafter, referred to as "node coordinate information") and also coordinate information indicating a position of an edge (hereinafter, referred to as "edge coordinate information"). It should be noted that characteristics of a keyword that can be obtained from a corpus or the like may be used for generating a spring graph.

The coordinate information storage unit 36 stores the node coordinate information and the edge coordinate information generated by the graph generation unit 35, and cluster coordinate information to be described later.

The cluster generation unit 37 groups a set of nodes existing within a predetermined distance as a cluster and generates cluster definition information associating keywords with a cluster. As a clustering technique, a k-means method or the like may be used. In addition, the cluster generation unit 37 generates coordinate information indicating a position of a cluster on a spring graph (hereinafter, referred to as "cluster coordinate information"). It should be noted that a user can freely modify the range, the depth or the like of a cluster.

The cluster definition information storage unit 38 stores cluster definition information generated by the cluster generation unit 37.

The display information generation unit 39 generates display information (contents of a web page, for example) for displaying a spring graph on the client 10, on the basis of the node coordinate information, the edge coordinate information and the cluster coordinate information, which are stored in the coordinate information storage unit 36.

The transmitter 41 transmits the display information generated by the display information generation unit 39 to the client 10 and also transmits a search query generated by the search query generation unit 44 to the search server 20.

The operation determination unit 42 determines, on the basis of operation information received by the receiver 31 from the client 10, the content of an instruction issued by a user. Here, the content of an instruction to be issued by a user is as follows. First one is an instruction to change the hierarchy level of the cluster being displayed to a deeper hierarchy level of a cluster using a more detailed keyword with a certain keyword as the base (hereinafter, referred to as a "hierarchy level change instruction"). Second one is an instruction to generate a new cluster by operating the generated spring graph and adding thereto a change related to a node (hereinafter, referred to as "node change instruction"). Third one is an instruction to select one cluster and automatically generate a search query (hereinafter, referred to as a "search query generation instruction").

The cluster re-generation unit 43 determines the content of a node change in a case where the operation determination unit 42 determines that a node change instruction has been issued. Then, the cluster re-generation unit 43 generates a new cluster in accordance with the content of the change. Here, the content of a node change includes changing of a cluster which a certain node belongs to, merging of two nodes, deletion of a certain node and the like.

It is to be noted that in this embodiment, the graph generation unit 35, the cluster generation unit 37 and the cluster re-generation unit 43 are provided as an example of a graph generation unit that generates a graph including multiple objects classified into multiple clusters, and that adds a change related to a specific object to the graph.

In a case where the operation determination unit 42 determines that a search query generation instruction has been issued, the search query generation unit 44 automatically generates a search query from selected cluster, so that the following conditions are satisfied, for example. The first condition is to include, as an AND condition, a keyword equivalent to an upper level node among keywords belonging to the selected cluster in the search query. The second condition is to include in the search query, as an AND condition, a condition including keywords equivalent to a lower level node among the keywords belonging to the selected cluster, the keywords being connected by OR. The third condition is to include in the search condition, as a NOT condition, a keyword having an extremely low degree of relevancy with a keyword included in the selected cluster. Here, the number of keywords to be included as an AND condition depends on the number of keywords in the selected cluster. If a certain web page does not include a keyword to be included as an AND condition, the web page is not found during the search. Accordingly, the number of keywords to be combined as an AND condition is kept at the minimum as a policy, and the number thereof is to be determined by the user. Moreover, the number of keywords to be combined as a NOT condition is not limited since the keywords are useful in excluding a web page not related to the search.

Next, a description will be given in detail of operations of the search support server 30 in the present embodiment. Here, as the operations of the search support server 30, there are an operation for transmitting a spring graph to the client 10 after receiving a search result from the search server 20 and an operation for transmitting a search query to the search server 20 after receiving operation information on the spring graph from the client 10. In this respect, these two operations are separately and sequentially described hereinafter.

First, a description will be given of the operation for transmitting a spring graph to the client 10 after receiving a search result from the search server 20.

Figure 3:
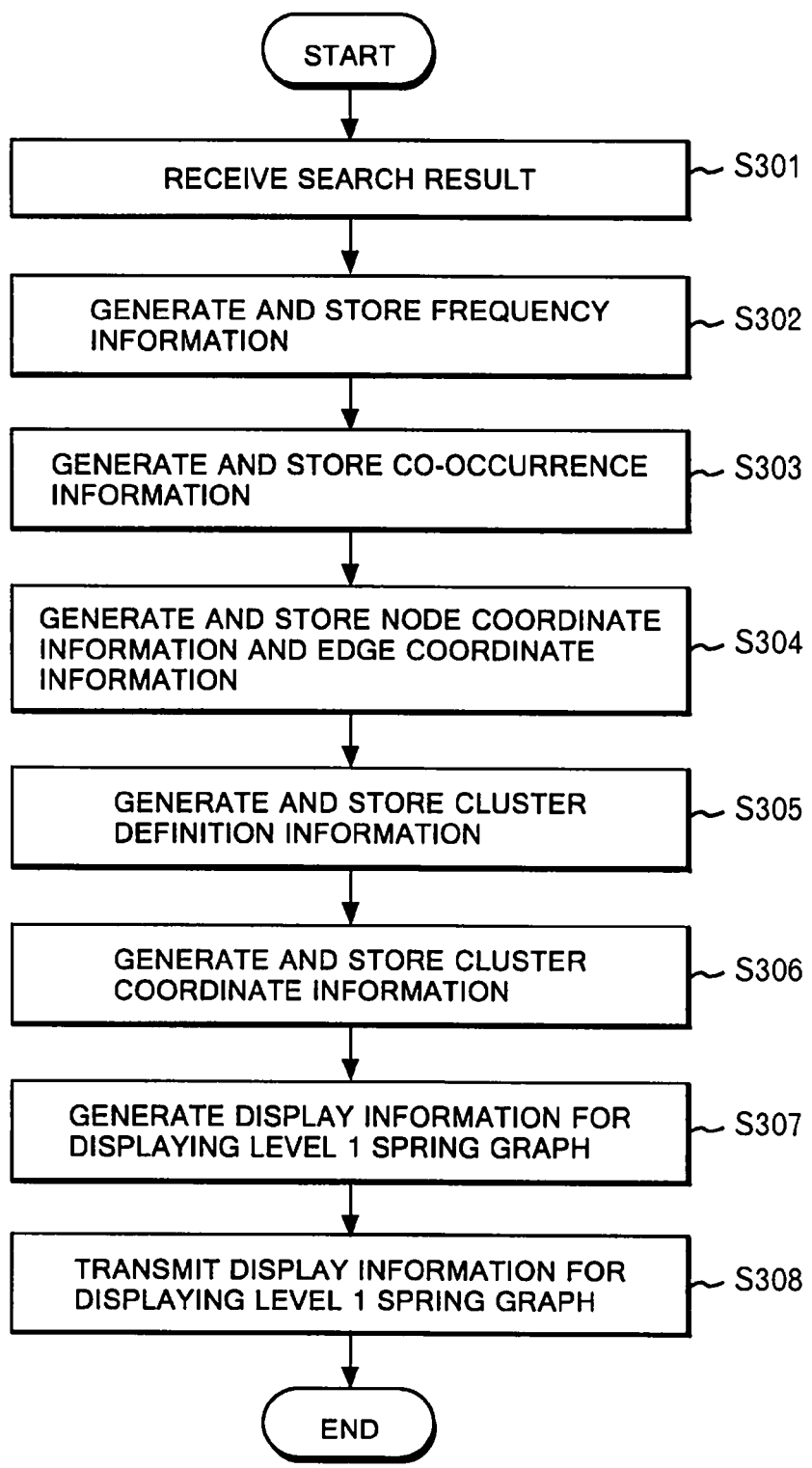
FIG. 3 is a flowchart showing an operation example of the search support server according to the embodiment of the present invention.

FIG. 3 shows a flowchart of an operation example of the search support server 30 in the aforementioned case.

In the search support server 30, the receiver 31 first receives a web page of a search result from the search server 20 and passes the web page to the related word extraction unit 32 (step 301).

Then, the related word extraction unit 32 extracts keywords from the web page passed from the receiver 31, then generates frequency information including appearance frequency of the keywords and frequency levels determined by the appearance frequency, and then stores the frequency information in the frequency information storage unit 33 (step 302). Here, the extraction of keywords from the web page may be performed by use of a known morphological analysis method. The keywords to be extracted here include a search word initially inputted by the user to obtain the search result and a related word related to the search word. In addition, the related word extraction unit 32 calculates a degree of co-occurrence between the keywords by use of a known method, then generates co-occurrence information including a co-occurrence matrix formed of the degrees of co-occurrence stored in a matrix format, for example, and then stores the co-occurrence information in the co-occurrence information storage unit 34 (step 303). Here, the co-occurrence matrix is preferably generated for each of the frequency levels found in step 302. It should be noted that specific examples of the frequency information and the co-occurrence information will be described later.

Next, the graph generation unit 35 generates coordinate information required for drawing a spring graph, by use of the co-occurrence information stored in the co-occurrence information storage unit 34, and then stores the generated coordinate information in the coordinate information storage unit 36 (step 304). Here, the spring graph is a graph representing the keywords by nodes and the degrees of co-occurrence between the keywords by edges between the nodes. Accordingly, the graph generation unit 35 generates the node coordinate information indicating a drawing position of a node and the edge coordinate information indicating a drawing position of an edge. Furthermore, it is preferable that the spring graph be generated for each hierarchy level in advance, and in a case where a display request for a spring graph of a deeper hierarchy level is issued, a spring graph of the corresponding hierarchy level be promptly displayed. The spring graph for each hierarchy level in the above described manner can be generated by use of a co-occurrence matrix for each of the frequency levels stored in the co-occurrence information storage unit 34. Incidentally, when generating a spring graph, the graph generation unit 35 places a hidden link indicating relevancy between keywords represented by nodes for all of the nodes. This is because the hidden link is implicitly used for specifying a keyword to be included as a NOT condition when a search query is generated, thereafter. In addition, a specific example of a spring graph will be described later.

Thereafter, the cluster generation unit 37 groups the nodes into clusters by a known method (a k-means method, for example) by use of the node coordinate information stored in the coordinate information storage unit 36. The cluster generation unit 37 then generates cluster definition information associating the keywords corresponding to the nodes with the clusters into which the nodes are classified, and then stores the cluster definition information in the cluster definition information storage unit 38 (step 305). It should be noted that a specific example of the cluster definition information will be described later. Moreover, a drawing position of a graphic is determined on the graph generated by use of the node coordinate information and the edge coordinate information stored in the coordinate information storage unit 36 so that a node can be included in a graphic indicating the corresponding cluster. Then, the cluster coordinate information indicating this drawing position is added in the coordinate information storage unit 36 (step 306).

When the node coordinate information, the edge coordinate information and the cluster coordinate information are stored in the coordinate information storage unit 36, the display information generation unit 39 generates display information for displaying an image in which a graphic indicating a cluster is superimposed on the spring graph, by use of these pieces of coordinate information and passes the image to the transmitter 41 (step 307). It should be noted that since this case is for displaying the initial spring graph, display information for displaying a level 1 spring graph is generated by use of the coordinate information corresponding to the upper-most hierarchy level (level 1).

Next, the transmitter 41 transmits the display information for displaying the level 1 spring graph, which is passed from the display information generation unit 39, to the client 10 (step 308). The spring graph is thereby displayed on an unillustrated display of the client 10.

Next, the aforementioned operation will be described using a specific example. It is to be noted that "Java" is a trademark or a registered trade mark of Sun Microsystems, Inc., in the United States or other countries, and "Windows" is a registered trade mark of Microsoft Corporation in the United States or other countries, hereinafter.

First, the frequency information to be generated in step 302 will be described.

FIG. 4 is a diagram showing a specific example of the frequency information.

As illustrated, the frequency information is information associating keywords, appearance frequency and frequency levels with each other. Here, the appearance frequency may be determined by a known method, but the maximum value of each appearance frequency is regulated to be 100. Each of the frequency levels is a level determined in accordance with corresponding appearance frequency among multiple levels prepared in advance. For example, suppose that the following rule is determined in advance. When appearance frequency is 70 or greater but not more than 100, the appearance frequency is classified as a frequency level 1. Moreover, when appearance frequency is 40 or greater but less than 70, the appearance frequency is classified as a frequency level 2.

Furthermore, the co-occurrence information to be generated in step 303 will be described.

FIG. 5 is a diagram showing a specific example of a co-occurrence matrix included in the co-occurrence information.

As illustrated, in the co-occurrence matrix, a keyword is set in each cell of the first row and each cell of the first column. Then, in a cell on which a column including a certain cell in the first row and a row including a certain cell in the first column intersect with each other, a degree of co-occurrence of two keywords respectively set in these two cells is set. It should be noted that in FIG. 5, cells in each of which a degree of co-occurrence not less than "20" is set is shown by a bold frame. This is because an assumption is made that an edge is placed between the nodes having a degree of co-occurrence not less than "20."

Incidentally, as is clear from the frequency information shown in FIG. 4, the illustrated co-occurrence matrix is a co-occurrence matrix in which degrees of co-occurrence between the keywords of frequency level 1 are set (level 1-level 1 co-occurrence matrix). However, for generating a spring graph for each hierarchy level, as described above, a co-occurrence matrix for each frequency level is preferably generated. Although it is not illustrated, a co-occurrence matrix in which degrees of co-occurrence between a keyword of the frequency level 1 and a keyword of the frequency level 2 are set (level 1-level 2 co-occurrence matrix), or degrees of co-occurrence between a keyword of the frequency level 2 and a keyword of the frequency level 2 are set (level 2-level 2 co-occurrence matrix) may be generated.

Furthermore, a description will be given of a spring graph based on the node coordinate information and the edge coordinate information generated in step 304.

Figures 6, 7:
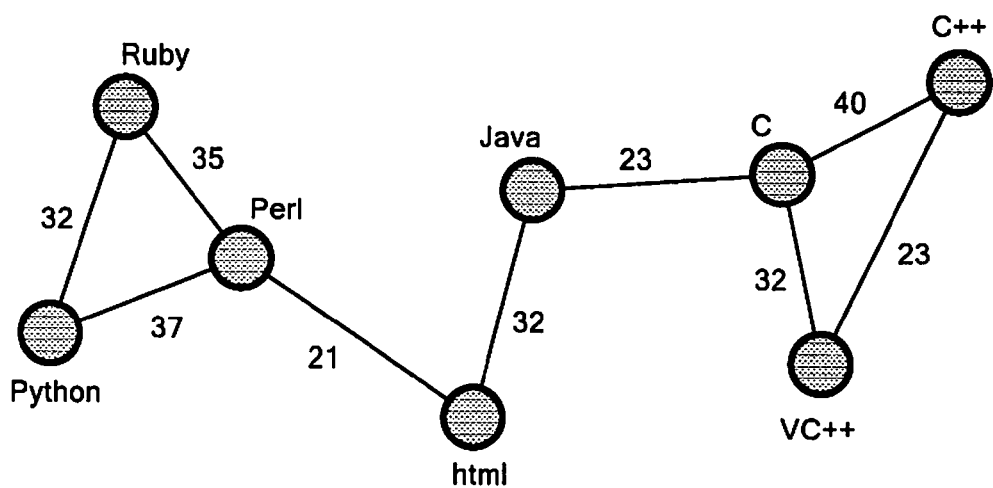
FIG. 6 is a specific example of a spring graph generated according to the embodiment of the present invention.
FIG. 7 is a specific example of cluster definition information generated according to the embodiment of the present invention.

FIG. 6 is a diagram showing a specific example of the spring graph. This spring graph is a spring graph representing relevancy between keywords of the frequency level 1, and is generated from the level 1-level 1 co-occurrence matrix shown in FIG. 5. In the spring graph, the node coordinate information is set, so that the higher the degree of co-occurrence, the closer the distance between the nodes. For example, a rule that an inverse number of the degree of co-occurrence of nodes is used as the distance between the nodes may be employed.

In this example, an assumption is made that a user initially inputs "Ruby," "Java" and "C++" as the search words and performs a search. As a result of the search, a search result as usual is displayed, but in this embodiment, a keyword having a high degree of co-occurrence with each of "Ruby," "Java" and "C++" is additionally extracted as a related word. Specifically, related words indicating a script language such as "Perl" and "Python" for "Ruby," a related word indicating a web system language such as "html" for "Java," and related words indicating the C language such as "C" and "VC++" for "C++" are extracted. Then, the relevancy between these keywords is visualized.

Furthermore, the cluster definition information generated in step 305 will be described.

FIG. 7 is a diagram showing a specific example of the cluster definition information.

As illustrated, the cluster definition information is information associating keywords with clusters to which the keywords belong.

Incidentally, as is clear from the frequency information shown in FIG. 4, the illustrated cluster definition information is one that associates the keywords of the frequency level 1 with the clusters in the spring graph of the hierarchy level 1. However, in a case where a spring graph for each hierarchy level is to be generated, cluster definition information as to a deeper hierarchy level is preferably generated. For example, suppose that a cluster 3 is classified into clusters 3-1, 3-2 and 3-3 in a spring graph of the hierarchy level 2. In this case, although it is not illustrated, cluster definition information associating the keywords of the frequency levels 1 and 2 that belong to the cluster 3 with the clusters 3-1, 3-2 and 3-3 may be generated.

Furthermore, a description will be given of a spring graph obtained by adding graphics based on the cluster coordinate information generated in step 306 on the spring graph of FIG. 6.

Figure 8:
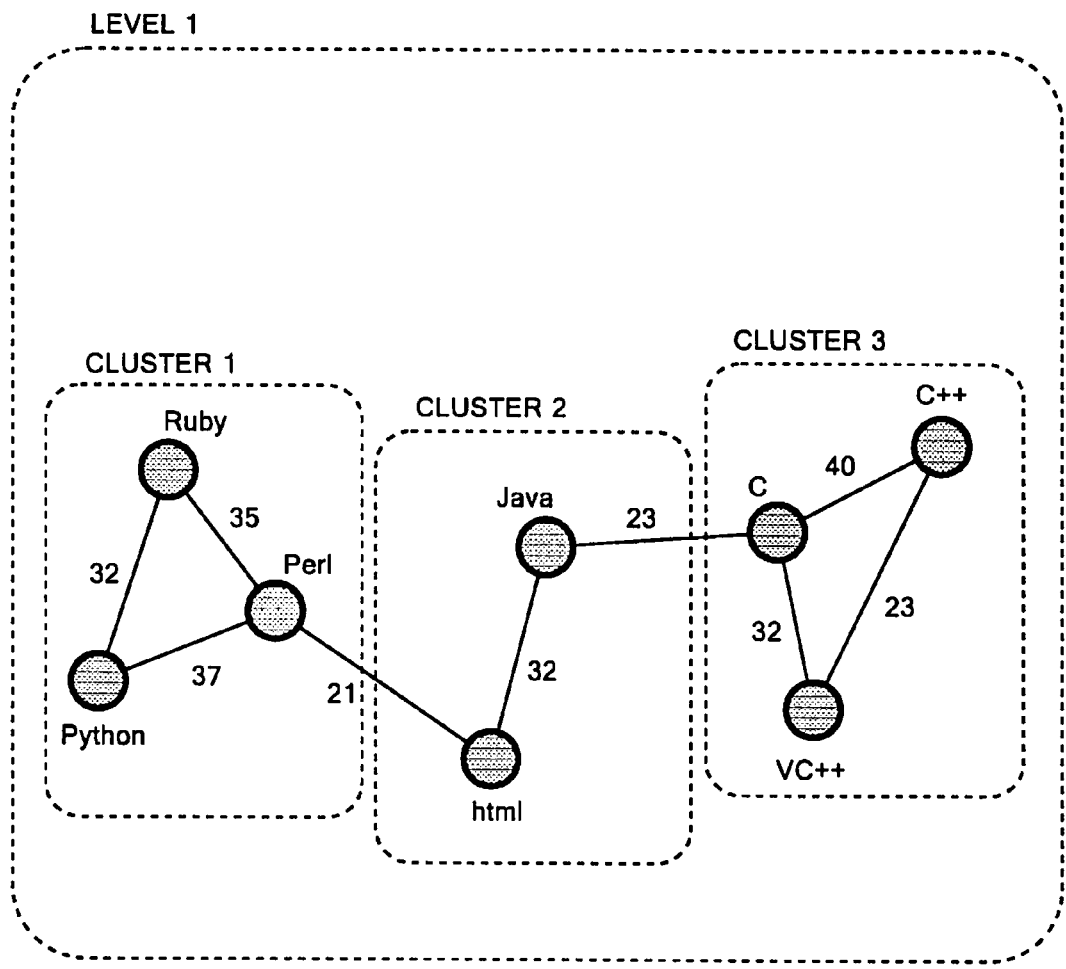
FIG. 8 is a diagram showing a specific example of a spring graph generated according to the embodiment of the present invention when graphics indicating clusters are added thereto.

FIG. 8 is a diagram showing a specific example of such a spring graph. As illustrated, in this spring graph, clusters each of which group has similar keywords into a single group are formed.

In this example, a graphic that surrounds the entire graph indicates that this spring graph is a spring graph of the hierarchy level 1 (in FIG. 8, simply described with "level 1"). As is clear from the cluster definition information shown in FIG. 7, "Perl," "Ruby" and "Python" belong to the cluster 1, "html" and "Java" belong to the cluster 2, and "C," "C++" and "VC++" belong to the cluster 3. Accordingly, a graphic indicating the cluster 1 is drawn so as to surround the nodes representing "Perl," "Ruby" and "Python," and a graphic indicating the cluster 2 is drawn so as to surround the nodes representing "html" and "Java." Moreover, a graphic indicating the cluster 3 is drawn so as to surround the nodes representing "C," "C++" and "VC++." Here, once the clusters are determined in the aforementioned manner, coordinate information that becomes a source of a spring graph of a lower hierarchy level may be stored for each of the clusters.

Next, a description will be given of the operation for transmitting a search query to the search server 20 upon receipt of operation information on a spring graph from the client 10.

To begin with, operations that can be performed by a user on the spring graph will be listed below.

Firstly there is an operation to change the keyword group that the user inputs to the search server 20. This operation further includes an operation to select a cluster and an operation to change a hierarchy level. The operation to select a cluster is performed for determining a search target category. Then, the operation to change a hierarchy level is an operation to be performed when a user desires to find a more detailed keyword (such as a keyword in a specialized field).

Secondly, there is another operation that is to change the spring graph itself. This operation includes operations to move a node between clusters, to merge a node with another node, and to delete a node. The operation to move a node between clusters is performed for changing an AND condition or a NOT condition in a search query. The operation to merge a node with another node is performed for coupling keywords corresponding to the nodes under an OR condition. The operation to delete a node is performed for ignoring a keyword corresponding to the node. Moreover, the operation to change a spring graph itself may be an operation to change the weighting of feature values. Since this operation has an influence on a degree of co-occurrence between keywords, the operation is to change a cluster. In addition, an operation to add or delete an edge may be performed as the operation to change the spring graph itself.

Figure 9:
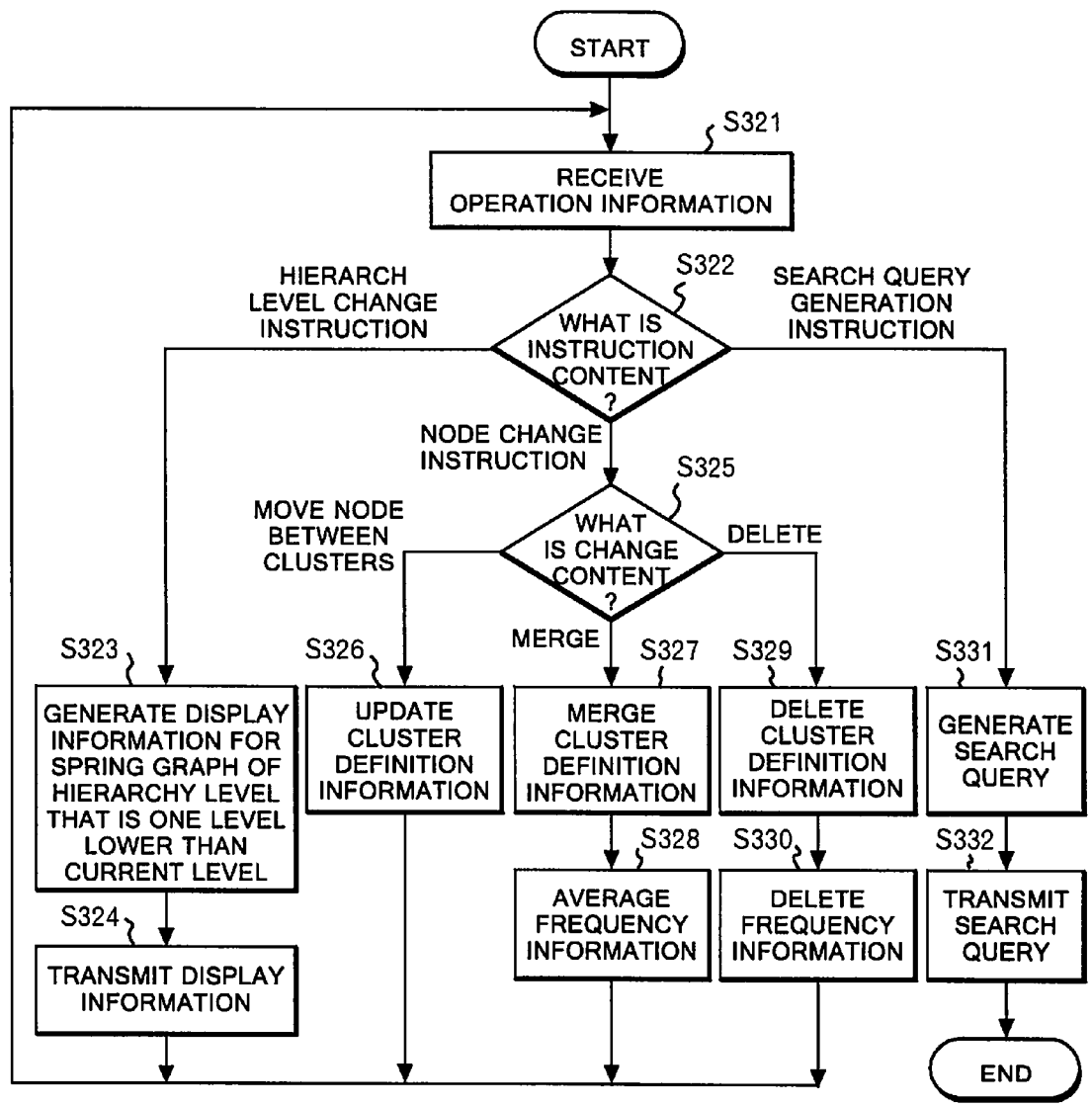
FIG. 9 is a flowchart showing an operation example of the search support server according to the embodiment of the present invention.

FIG. 9 is a flowchart showing an operation example of the search support server 30 in accordance with the aforementioned user operations.

When operation information is transmitted from the client 10, the receiver 31 receives the operation information and then passes the operation information to the operation determination unit 42 in the search support server 30 (step 321).

Then, the operation determination unit 42 determines, on the basis of the operation information received by the receiver 31, the content of an instruction issued by the user (step 322).

Suppose that, as a result of the determination, it is determined that the content of the instruction is the instruction of a hierarchy level change. This determination can be made by confirming that the information received from the receiver 31 includes identification information of the selected cluster and information for changing a hierarchy level. In this case, the operation determination unit 42 notifies the display information generation unit 39 that the instruction of a hierarchy level change has been issued. Then, the display information generation unit 39 generates display information for displaying the spring graph by use of coordinate information that corresponds to a hierarchy level that is at one level lower than the hierarchy level of the spring graph including the selected cluster and that corresponds to the selected cluster (step 323). The coordinate information here is selected from the coordinate information stored in the coordinate information storage unit 36. The display information generation unit 39 then transmits the generated display information to the transmitter 41 (also step 323).

Then, the transmitter 41 transmits the display information to the client 10 (step 324). The spring graph is thereby displayed on an unillustrated display of the client 10.

Furthermore, suppose that the content of the instruction is an instruction of a node change. This determined can be made by confirming that the information passed from the receiver 31 includes identification information of the selected node. In this case, the operation determination unit 42 passes the information passed from the receiver 31 to the cluster re-generation unit 43, and then, the cluster re-generation unit 43 determines the content of the node change (step 325).

Here, suppose that the information passed from the operation determination unit 42 includes identification information of a node and coordinate information of the node. This is a case where an operation to change a certain node is performed, and the identification information of the node of the moving target and the coordinate information of the moving destination are passed.

In this case, the cluster re-generation unit 43 refers to the coordinate information storage unit 36 and then specifies a cluster including the coordinate information of the moving destination. In the meantime, the cluster re-generation unit 43 refers to the cluster definition information storage unit 38 and then specifies a cluster originally including the node of the moving target. Then, the cluster re-generation unit 43 compares these clusters. If these clusters are different, as a result of the comparison, the cluster re-generation unit 43 determines that the content of the node change is the moving of the node between the clusters. Thereafter, the cluster re-generation unit 43 rewrites the identification information of the cluster associated with a keyword corresponding to the node of the moving target with the identification information of the cluster of the moving destination, in the cluster definition information stored in the cluster definition information storage unit 38 (step 326).

In addition, the cluster re-generation unit 43 refers to the coordinate information storage unit 36 and then determines whether or not coordinate information of a different node exists within a predetermined distance from the coordinate information of the moving destination. When it is determined as a result that coordinate information of a different node exists, the cluster re-generation unit 43 determines that the content of the node change is a merger of the node of the moving target with the different node (the node of the moving destination). Then, the cluster re-generation unit 43 updates the cluster definition information stored in the cluster definition information storage unit 38 (step 327). Specifically, the cluster re-generation unit 43 merges the correspondence between the cluster and a keyword corresponding to the node of the moving target with the correspondence between the cluster and a keyword corresponding to the node of the moving destination. The cluster re-generation unit 43 as a result changes the correspondences to a correspondence between the cluster of the moving destination and a keyword group including the keyword corresponding to the node of the moving target and the keyword corresponding to the node of the moving destination. Then, the cluster re-generation unit 43 sets information obtained by averaging the information on the keyword group including the keyword corresponding to the node of the moving target and the keyword corresponding to the node of the moving destination in the frequency information stored in the frequency information storage unit 33 (step 328). Specifically, the correspondence between the keyword corresponding to the node of the moving target and the appearance frequency and the frequency level is merged with the correspondence between the keyword corresponding to the node of the moving destination and the appearance frequency and the frequency level. These correspondences are as a result changed to a correspondence between the keyword group including the keyword of the node of the moving target and the keyword of the node of the moving destination and the average value of the appearance frequency of these keywords and the frequency level corresponding to the average value thereof.

It should be noted that for the sake of simplification, an assumption is made herein that the moving of a node between clusters and a merger of nodes do not occur at the same time. However, it is possible to determine that such events occur at the same time and then to perform the processing in steps 326 to 328 simultaneously.

In addition, suppose that the information passed by the operation determination unit 42 includes identification information of a node and a null value as the coordinate information of the node. This is a case where an operation to delete a certain node is performed, and also identification information of the node of the deletion target is passed from the operation determination unit 42.

In this case, the cluster re-generation unit 43 deletes information related to a keyword corresponding to the node of the deletion target in the cluster definition information stored in the cluster definition information storage unit 38 (step 329). Then, the cluster re-generation unit 43 deletes information related to the keyword corresponding to the node of the deletion target in the frequency information stored in the frequency information storage unit 33 (step 330).

Furthermore, suppose that the content of the instruction determined in step 322 is a search query generation instruction. This determination can be made by confirming that the information passed from the receiver 31 includes identification information of the selected cluster and information to generate a search query. In this case, the operation determination unit 42 notifies the search query generation unit 44 of the content of the instruction. Then, the search query generation unit 44 generates a search query and passes the search query to the transmitter 41 (step 331). At this time, firstly, a keyword equivalent to an upper level node among keywords that belong to the selected cluster is included as an AND condition. Secondly, a condition connecting to, by "OR," a keyword equivalent to a lower node among the keywords that belong to the selected cluster is included as an AND condition. Thirdly, a keyword having a lowest relevancy with a keyword included in the selected cluster among keywords in a different cluster at the same hierarchy level as that of the selected cluster is included as a NOT condition.

Then, the transmitter 41 transmits a search query to the search server 20 (step 332). The search server 20 thereby performs a search on the Internet on the basis of the search query and replies to the search support server 30 with a web page of the search result. Then, the search support server 30 transmits this search result to the client 10. The search result is thereby displayed on an unillustrated display of the client 10. Alternatively, the search server 20 may directly transmit the search result to the client 10.

Next, the aforementioned operation will be described by use of a specific example. It is to be noted that hereinafter, in the description below, "Java" is a trademark or a registered trade mark of Sun Microsystems, Inc., in the United States or other countries, and "Windows" is a registered trade mark of Microsoft Corporation in the United States or other countries.

Firstly, a description will be given of a specific example of the operation in a case where the content of the instruction in step 322 is determined to be a hierarchy level change instruction.

Figure 10:
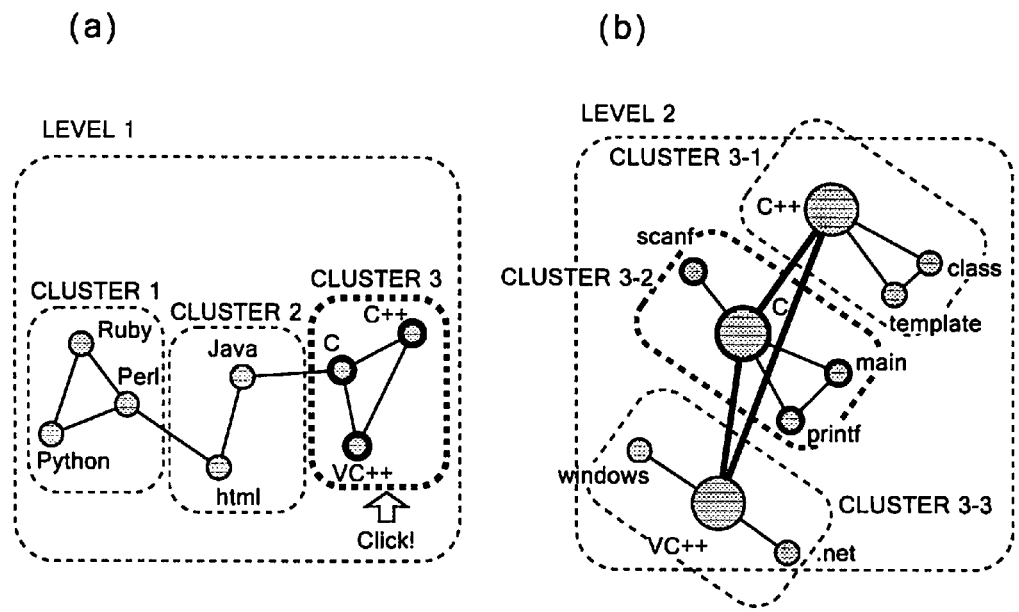
FIGS. 10A and 10B are diagrams showing a specific example of a change in the spring graph when a hierarchy level change instruction is issued in the embodiment of the present invention.

FIGS. 10A and 10B are diagrams showing a specific example of a change in a spring graph in this case.

As shown in FIG. 1A, the spring graph of the hierarchy level 1 includes clusters 1, 2 and 3. Suppose that when a user sees this spring graph, the user wishes to acquire further a specialized knowledge as to the cluster 3. In this case, as illustrated, the user is allowed to select the cluster 3 by clicking a region of the cluster 3. Here, a state in which the cluster 3 is selected is shown with the bold broken line indicating the region of the cluster 3 in FIG. 1A. Upon selection of the cluster 3, the user can then view the spring graph of the hierarchy level 2, which focuses on the keywords included in the cluster 3, as shown in FIG. 10B. Then, in this spring graph as well, clusters 3-1, 3-2 and 3-3, which are lower level clusters than the cluster 3, are generated as in the case of hierarchy level 1.

It should be noted that in this spring graph of the hierarchy level 2, the upper level nodes are displayed by use of larger graphics than those of the lower level nodes. Such a display configuration is made possible since the co-occurrence matrix is generated for each frequency level of keywords, and the frequency level of the keywords represented by the node can be provided to the node coordinate information stored in the coordinate information storage unit 36.

Here, a specific example of a search query generated when a cluster is selected on a spring graph is shown.

For example, suppose that a user wishes to perform a search for the cluster of "C,", "main," "scanf" and "printf." In this case the user selects the cluster 3-2. A state in which the cluster 3-2 is selected is shown with the bold broken line indicating the region of the cluster 3-2 in FIG. 10B. Here, the keyword corresponding to the upper level node in the cluster 3-2 is "C." Accordingly, the search query generation unit 44 first includes "C" in the search query as an AND condition. In addition, the keywords corresponding to the next upper level node are "main," "scanf" and "printf." The search query generation unit 44 thus includes a condition where "main," "scanf" and "printf" are connected to each other by "OR" as an AND condition in the search query. Moreover, other clusters of the same hierarchy level as that of the cluster 3-2 are the clusters 3-1 and 3-3. The keywords belong to these clusters are "C++," "template," "class," "VC++," "windows," and ".net." Accordingly, the search query generation unit 44 lastly includes a condition where "C++," "template," "class," "VC++," "windows," and ".net," are connected to each other by OR in the search query as a NOT condition. Specifically, the search query herein is as follows: (C)&(scanf|main|printf)&!(C++|class|template|VC++|windows|.net) Here, it is to be noted that "and" is expressed by "&" and "not" is expressed by "!."

Moreover, a specific example of an operation in a case where the content of the instruction is determined to be a node change instruction in step 322. In this case, the user is allowed to move a node between clusters, to merge a node with another node and to delete a node. However, among these operations, the operation when the user moves a node between clusters will be exemplified herein.

Figure 11:
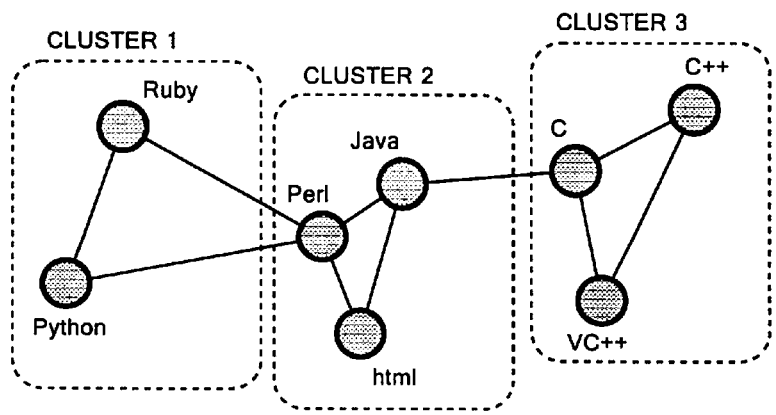
FIG. 11 is a diagram showing a specific example of a change in the spring graph when an instruction to move a node between clusters is issued in the embodiment of the present invention.

FIG. 11 is a diagram showing a specific example of a change in a spring graph in this case.

In this example, as illustrated, the node indicating "Perl" originally displayed within the graphic representing the cluster 1 is moved into the graphic representing the cluster 2. Accordingly, in step 326 of FIG. 9, the search support server 30 updates the cluster definition information managed by the cluster definition information storage unit 38. Here, since the node indicating "Perl" is moved to the cluster 2, an edge that does not exist originally is placed between the node indicating "Perl" and the node indicating "Java." This is because the distance between the node indicating "Perl" and the node indicating "Java" become less than that in the case where the degree of co-occurrence is "20." However, such a new edge does not have to be drawn.

FIG. 12 is a diagram showing a specific example of the cluster definition information after the information is updated in step 326.

As shown in FIG. 7, the cluster corresponding to the keyword, "Perl," is the cluster 1 before the node indicating "Perl" is moved into the graphic representing the cluster 2. However, after the operation shown in FIG. 11 is performed, the cluster that corresponds to the keyword, "Perl," becomes the cluster 2 as shown in the bold frame in FIG. 12.

In addition, in this example, since "VC++" is an abbreviation of "Visual C++," a possibility that "Visual C++" appears as a node is extremely high. The user merges "VC++" with "Visual C++," and the system connects these two words by OR and then performs a search. However, it is a very troublesome work for the user to specify such a query as the keyword, and it is not realistic. However, such a troublesome work can be reduced and the search condition can be optimized by providing a system that automatically generates a search condition via a spring graph.

The present embodiment has been described above.

Incidentally, in this embodiment, the graph generation unit 35 is configured to generate display information for displaying a spring graph on the basis of only coordinate information. This is because co-occurrence information that is the base of the coordinate information includes a frequency level of each keyword, and thus the frequency level information is provided in the coordinate information in other words. However, in a case where a frequency level is not included in the co-occurrence information and is not included in the coordinate information either, the graph generation unit 35 may refer to a frequency level stored in the frequency information storage unit 33 when generating the spring graph.

Moreover, a search query generated by the search query generation unit 44 in this embodiment is only an example. The search query may be one that includes a keyword represented by an object belonging to the selected cluster as any one of an AND condition and an OR condition, and also that includes a keyword represented by an object that belongs to a cluster different from the selected cluster as a NOT condition. Furthermore, at this time, whether a keyword is to be included as an AND condition or an OR condition may be determined in advance in accordance with the appearance frequency of the keyword.

As described above, in this embodiment, when a search is performed on the basis of a search word, a spring graph generated on the basis of a keyword group including the search word and a related word extracted from the search result is provided in addition to a list of web pages of the search result. Then, the user is allowed to change the relevancy between keywords by operating the spring graph and to automatically generate a search condition by selecting a predetermined range of the spring graph. Specifically, a search that conforms to the request of a user is made possible without causing the user to be aware of a complicated search condition.

Specifically, the following can be enabled according to each of the components.

Firstly, a spring graph generated on the basis of a keyword group extracted from the search result is provided in addition to a list of web pages of the search result. The user is thereby allowed to know validity of the search word used for the search and relevancy with a related word to be used as a search word in the next search.

Moreover, in this embodiment, a relationship between keywords is visualized by use of a spring graph, and a user is allowed to operate the spring graph. Thereby, in addition to an AND condition, which is frequently used by a user, an OR condition (words having the same meaning) and a NOT condition (word not related to the field) can be automatically generated.

Furthermore, in this embodiment, a spring graph is configured to include a hierarchy structure and an upper level and lower level concept is provided to keywords. The user is thereby allowed to adjust the depth of the content of a web page that the user wishes to search.

In addition, when a large number of search words is specified as an AND condition, there occurs a problem that a web page that is actually useful to the user is not included in a search result since one of the search words is not included in the web page. In this respect, the number of search words used for AND conditions is to be suppressed by generating a large number of NOT conditions by using the characteristics of a spring graph. Accordingly, only web pages that are the interests of the user can be searched for. It should be noted that there may be a case where a web page that is useful to the user is not included in the search result since the NOT condition is specified. However, a keyword having a degree of co-occurrence with the keyword of the search target equal to or greater than a constant value can be removed even as a NOT condition.

This embodiment is applicable in the following cases.

Firstly, there is a case where the validity of a search word is unknown. In this case, the user can know a different search word that is useful for the search from the position of the original search word in the spring graph.

Secondly, there is a case where many search words are general words, so that a large amount of search results exists, but multiple search words are needed. According to the embodiment, the user can perform a search simply with a large number of search words without paying attention to the search conditions such as AND, OR and NOT. As a result, the user can easily narrow down the search target. Although a large number of AND conditions is needed in this case, the user does not have to find search words by himself or herself.

Figure 13:
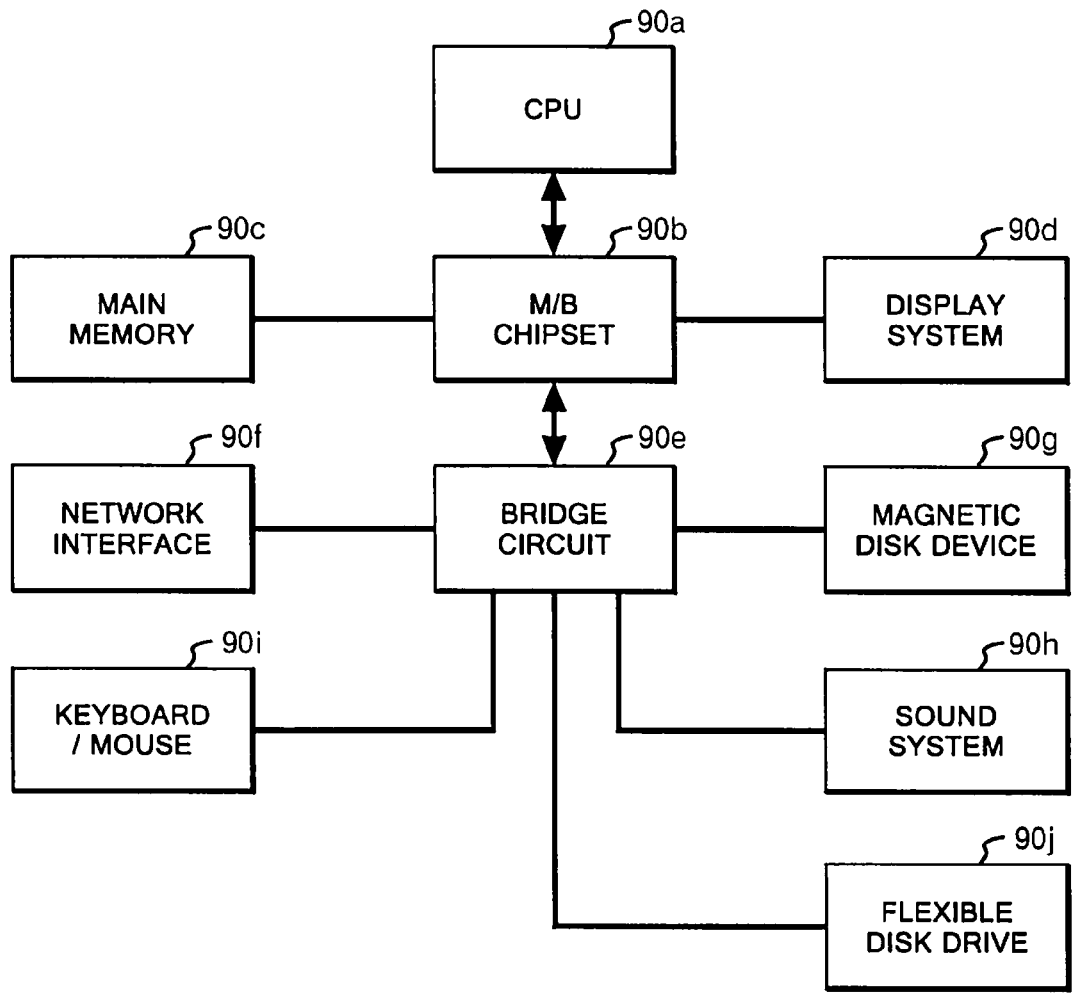
FIG. 13 is a diagram showing a hardware configuration of a computer to which the embodiment of the present invention can be applied.

Lastly, a description will be given of a hardware configuration of a suitable computer to which the embodiment of the present invention is applied. FIG. 13 is a diagram showing an example of such a hardware configuration of the computer. As illustrated, the computer includes a central processing unit (CPU) $90a$, which is arithmetic means, a main memory $90c$ connected to the CPU $90a$ via a mother board (M/B) chipset $90b$, and a display system $90d$ connected to the CPU $90a$ via the M/B chipset $90b$ likewise. Furthermore, a network interface $90f$, a magnetic disk device (HDD) $90g$, a sound system $90h$, a keyboard/mouse $90i$, and a flexible disk drive $90j$ are connected to the M/B chipset $90b$ via a bridge circuit $90e$.

Here, each constituent element is connected via a bus in FIG. 13. For example, the CPU $90a$ and the M/B chipset $90b$, and the M/B chipset $90b$ and the main memory $90c$ are connected to each other via a CPU bus. Furthermore, the M/B chipset $90b$ and the display system $90d$ may be connected via an accelerated graphics port (AGP), but when the display system $90d$ includes a PCI Express video card, the M/B chipset $90b$ and this video card are connected via a PCI Express (PCIe) bus. Moreover, a PCI Express, for example, can be used to connect the network interface $90f$ to the bridge circuit $90e$. In addition, serial AT attachment (ATA), parallel ATA or peripheral components interconnect (PCI), for example, can be used to connect the magnetic disk device $90g$ to the bridge circuit $90e$. In addition, universal serial bus (UBS) can be used to connect the keyboard/mouse $90i$ and flexible disk drive $90j$ to the bridge circuit $90e$.

The present invention may be implemented by hardware alone or software alone. Furthermore, the present invention may be implemented by both hardware and software. In addition, the present invention can be implemented as a computer, a data processing system, and a computer program. This computer program can be stored in a computer-readable medium to be offered. Here, applicable media include an electronic, magnetic, optical, electromagnetic, infrared or semiconductor system (device or apparatus), or a propagated medium. Moreover, exemplifiable media which are readable by a computer include a semiconductor, a solid-state storage device, a magnetic tape, a removable computer diskette, a random access memory (RAM), a read only memory (ROM), a rigid magnetic disk, and an optical disk. As an example of the optical disk at the present time, a compact disc-read only memory (CD-ROM), a compact disc-read/write (CD-R/W), and a DVD are included.

According to the present invention, a user is allowed to specify a keyword appropriate for a search through a simple operation and to perform the search in accordance with a user request.

As described above, the description has been given of the embodiment of the present invention; however, the technical scope of the present invention is not limited to the aforementioned embodiment. It is obvious to those skilled in the art that various modifications can be made and that alternative aspects can be adopted, without departing from the spirit and the scope of the present invention.

What is claimed is:

1. A computer system for supporting a document data search based on a keyword, comprising:
    an extraction unit that extracts a plurality of keywords from search target document data;
    a graph generation unit that generates a graph including a plurality of objects respectively representing the plurality of keywords extracted by the extraction unit and being classified into a plurality of clusters;
    a search condition statement generation unit that generates a search condition statement by use of a keyword, in accordance with a user operation to select a specific cluster among the plurality of clusters in the graph generated by the graph generation unit, the keyword being represented by an object that belongs to the specific cluster; and
    among keywords that appear in the search target document data, the extraction unit extracts keywords that appear at a specific level of frequency, as the plurality of keywords corresponding to the specific level, and in accordance with a user operation to specify the specific level, the graph generation unit generates the graph including a plurality of objects respectively representing the plurality of keywords corresponding to the specific level and being classified into a plurality of clusters.

2. The computer system according to claim 1, wherein the graph generation unit generates the graph in which the plurality of objects are arranged respectively at such positions that a distance between two objects of the plurality of objects corresponds to a degree of co-occurrence of two keywords represented by the two objects, and in which the plurality of objects are classified into the plurality of clusters on the basis of information on the positions.

3. The computer systems according to claim 1, wherein, in accordance with a user operation on a specific object included in the graph, the graph generation unit adds a change related to the specific object to the graph.

4. The computer system according to claim 3, wherein the change related to the specific object is a change to cause the specific object belonging to a first cluster to belong to a second cluster.

5. The computer system according to claim 3, wherein the change related to the specific object is to merge the specific object and an object different from the specific object and thereby to obtain a single object representing a keyword represented by the specific object and a keyword represented by the different object.

6. The computer system according to claim 3, wherein the change related to the specific object is a change to delete the specific object.

7. The computer system according to claim 1, wherein the search condition statement generation unit generates the search condition statement including the keyword represented by the object belonging to the specific cluster as any one condition of an AND condition and an OR condition, which is determined previously in accordance with appearance frequency of the keyword.

8. The computer system according to claim 7, wherein the search condition statement generation unit generates the search condition statement including, as a NOT condition, a keyword represented by an object that belongs to a cluster other than the specific cluster.

9. A computer system for supporting a document data search based on a keyword, comprising:
an extraction unit that extracts a plurality of keywords from search target document data;
a graph generation unit that generates a graph including a plurality of objects respectively representing the plurality of keywords extracted by the extraction unit, the plurality of objects being arranged respectively at such positions that a distance between two objects of the plurality of objects corresponds to a degree of co-occurrence of two keywords represented by the two objects, and the plurality of objects being classified into a plurality of clusters on the basis of information on the positions; and
a search condition statement generation unit that generates a search condition statement in accordance with a user operation to select a specific cluster among the plurality of clusters in the graph generated by the graph generation unit, the search condition statement including a keyword represented by an object that belongs to the specific cluster, as any one condition of an AND condition and an OR condition, and also a keyword represented by an object that belongs to a cluster other than the specific cluster, as a NOT condition.

10. A method of supporting a document data search based on a keyword, comprising the steps of:
extracting a plurality of keywords from search target document data;
generating a graph including plurality of objects respectively representing the extracted plurality of keywords, the plurality of objects being arranged respectively at such positions that a distance between two objects of the plurality of objects corresponds to a degree of co-occurrence of two keywords represented by the two objects, and the plurality of objects being classified into a plurality of clusters on the basis of information on the positions; and
generating a search condition statement in accordance with a user operation to select a specific cluster among the plurality of clusters in the graph, the search condition statement including a keyword represented by an object that belongs to the specific cluster, as any one condition of an AND condition and an OR condition, and also a keyword represented by an object that belongs to a cluster other than the specific cluster, as a NOT condition.

11. A method of supporting a document data search based on a keyword, comprising the steps of:
extracting a plurality of keywords from search target document data;
generating a graph including a plurality of objects respectively representing the extracted plurality of keywords and being classified into a plurality of clusters;
generating a search condition statement by use of a keyword, in accordance with a user operation to select a specific cluster among the plurality of clusters in the graph, the keyword being represented by an object that belongs to the specific cluster; and
among keywords that appear in the search target document data, extracting keywords that appear at a specific level of frequency, as the plurality of keywords corresponding to the specific level, and in accordance with a user operation to specify the specific level, generating the graph including a plurality of objects respectively representing the plurality of keywords corresponding to the specific level and being classified into a plurality of clusters.

12. A program stored in a solid-state storage device that causes a computer to function as an apparatus for supporting a document data search based on a keyword, the program causing the computer to function as:
an extraction unit that extracts a plurality of keywords from search target document data;
a graph generation unit that generates a graph including a plurality of objects respectively representing the plurality of keywords extracted by the extraction unit and being classified into a plurality of clusters;
a search condition statement generation unit that generates a search condition statement by use of a keyword, in accordance with a user operation to select a specific cluster among the plurality of clusters in the graph generated by the graph generation unit, the keyword being represented by an object that belongs to the specific cluster; and
among keywords that appear in the search target document data, the extraction unit extracts keywords that appear at a specific level of frequency, as the plurality of keywords corresponding to the specific level, and in accordance with a user operation to specify the specific level, the graph generation unit generates the graph including a plurality of objects respectively representing the plurality of keywords corresponding to the specific level and being classified into a plurality of clusters.

* * * * *